UNITED STATES PATENT OFFICE.

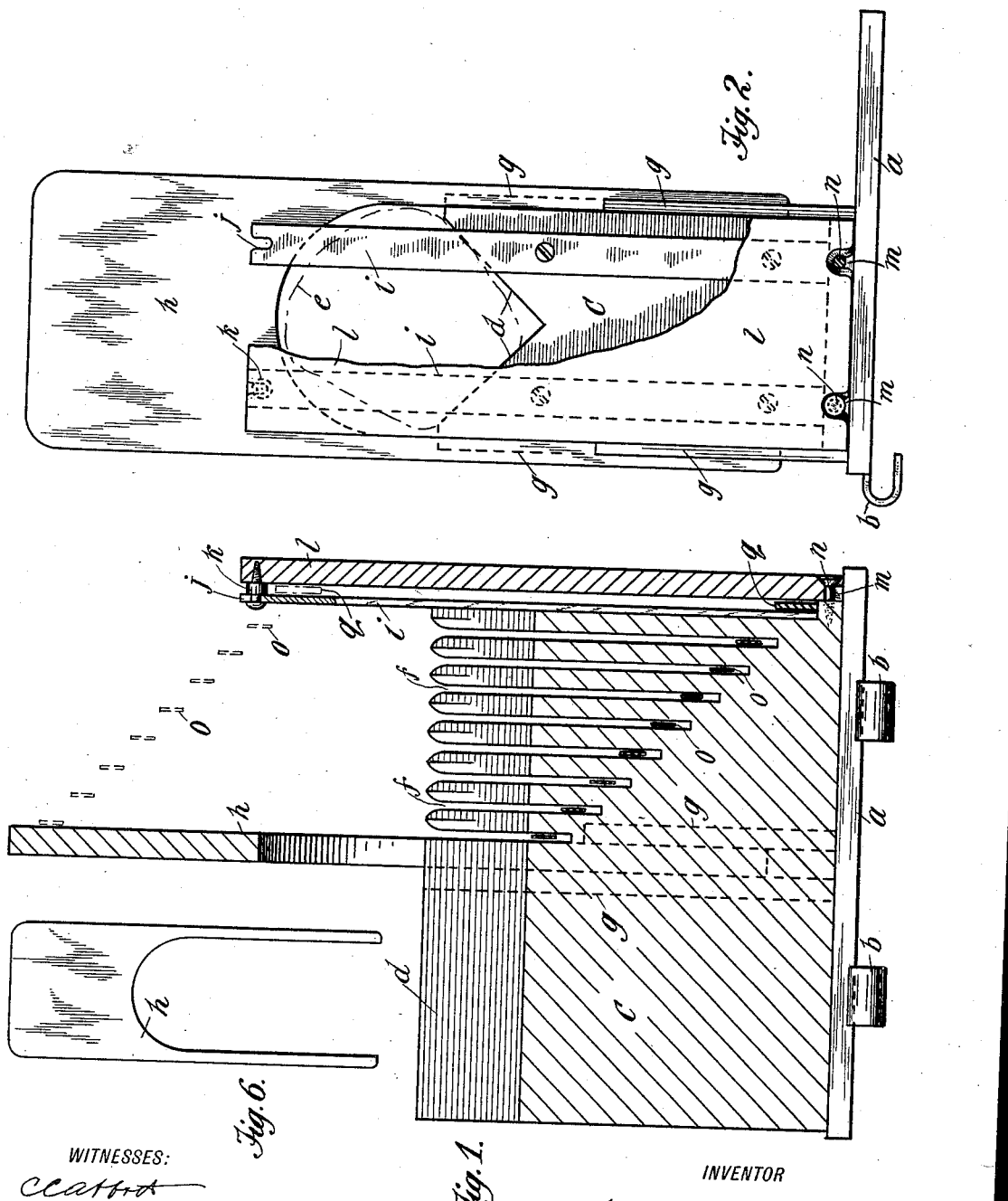

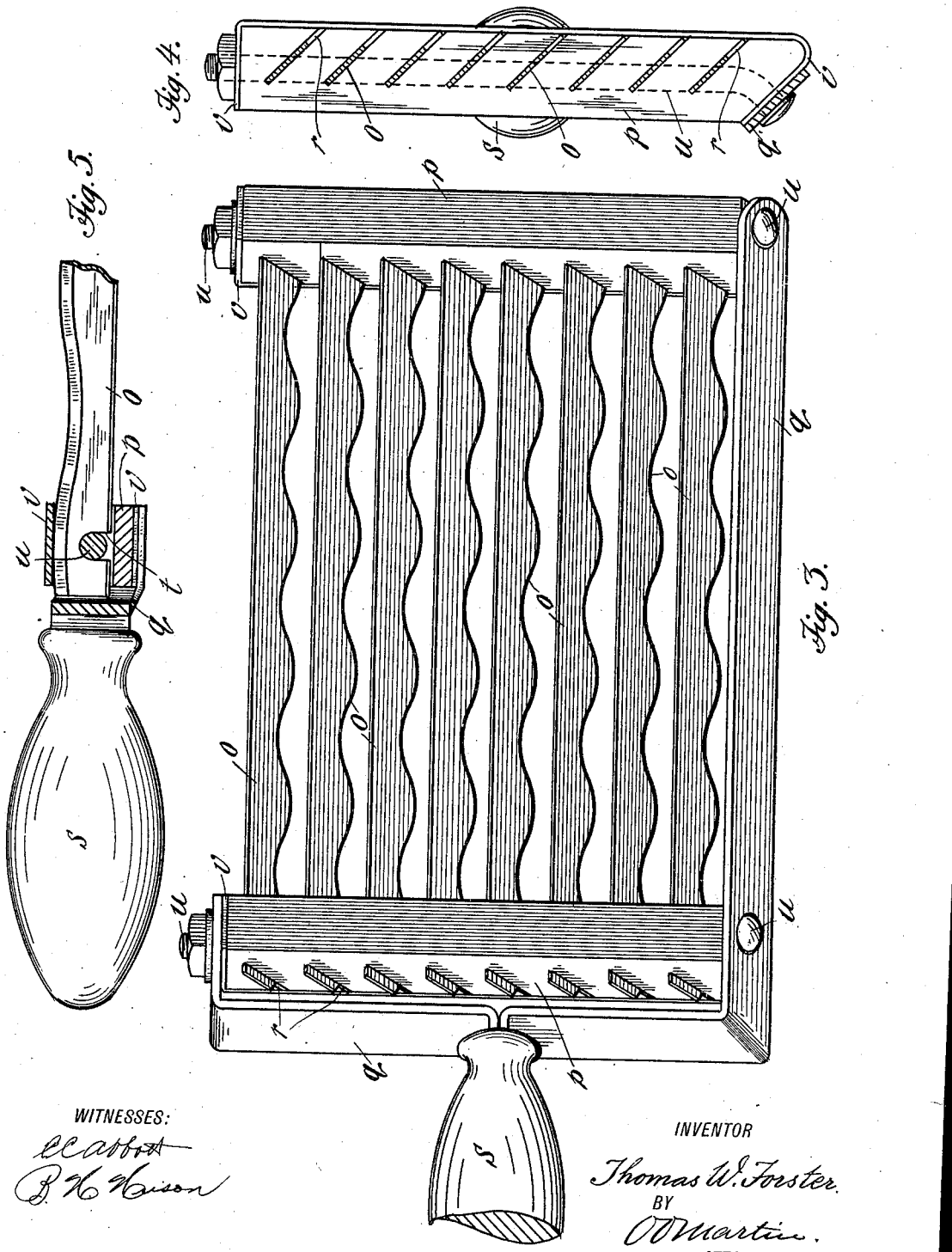

THOMAS W. FORSTER, OF PORTLAND, OREGON.

BREAD-CUTTER.

1,031,111. Specification of Letters Patent. Patented July 2, 1912.

Application filed September 5, 1911. Serial No. 647,774.

*To all whom it may concern:*

Be it known that I, THOMAS W. FORSTER, a subject of the King of Great Britain, residing at Portland, in the county of Multnomah and State of Oregon, have invented certain new and useful Improvements in Bread-Cutters, of which the following is a specification.

My invention relates to improvements in a machine for slicing bread, and the object of my invention is to cut a plurality of slices of bread at one operation and of uniform thickness.

A further object is to provide improved means for guiding the cutting mechanism on the bread support.

The objects and features of my invention are clearly set forth in the following description and illustrated in the appended drawings, of which:

Figure 1 is a sectional front elevation of the bread support, the cutting mechanism being merely indicated to show its relation to said support, Fig. 2 is an end elevation in agreement with Fig. 1 and with parts broken away for the sake of clearness, Fig. 3 illustrates perspectively the cutting mechanism, Fig. 4 is a cross sectional view of Fig. 3, Fig. 5 is a sectional plan view of the cutting mechanism, and Fig. 6 is a detail view showing a part of the guiding means for the cutting mechanism.

My device is mounted on a suitable base $a$, which may be provided with means as hooks $b$, for steadying the machine on the table or other receptacle, on which it is placed.

The main part of my device is a block $c$ made of wood or other suitable material having at its top a V shaped groove $d$, adapted to receive the bread loaf to be cut. The block is furthermore made with a series of notches $f$, equidistant and disposed at right angle to groove $d$. Guide strips $g$, integral with block $c$, are adapted to receive a detachable vertically disposed frame $h$, positioned parallel with notches $f$. To one end of block $c$ I secure a pair of vertically disposed bars $i$, the upper ends of which are provided with notches $j$, adapted to receive shouldered studs $k$ of guide plate $l$. At the bottom plate $l$ is made with notches $m$ engaging studs $n$ of block $c$. By this construction guide plate $l$ is detachably secured to the block.

The cutting mechanism comprises a series of knives $o$, which are suspended between strips $p$ of cutter frame $q$ in the following manner. Strips $p$ are provided with a series of parallel diagonally disposed notches $r$, into which the ends of knives $o$ are inserted. The latter are at their ends made with notches $t$, through which extend a pair of bolts $u$, by means of which the entire cutting mechanism is tied together as clearly shown in Figs. 3, 4 and 5. The knives are locked in place by a pair of retaining bars $v$, which, as shown in the drawing, are also clamped in position by bolts $u$.

To place the cutting mechanism in its operating position, guide plate $l$ is first removed and the cutter dropped into slots $f$ of block $c$, whereupon said guide plate is again attached to the block. The cutter is then raised until the loaf to be cut is free to pass under the knives, and the cutting operation may commence. During the cutting operation the cutter, as clearly shown in Fig. 1 is guided between frame $h$, guide plate $l$ and bars $i$, thus insuring the correct registration of the knives with notches $f$, which furthermore are made wider than the knives. The loaf may be held in place by resting the left hand on its free end, or frame $h$ may conveniently be employed to clamp the loaf in place.

It is obvious that the knives must be spaced to correspond with slots $f$ into which they sink, and the knives may be made wide or narrow as conditions require. But the knives are preferably relatively so positioned, that the bottom edge of the uppermost knife is higher than the top edge of the succeeding knife and so forth. This feature is clearly indicated in Fig. 1, and is necessary in order to permit the knives to operate without tearing or breaking the bread. By referring to Fig. 1 it is also noticed, that the lower edge of cutter frame $q$ is so positioned relative to knives $o$, that it comes to rest on block $c$ before said knives reach the bottom of notches $f$, thereby preventing the cutting edges of the knives from touching said notch bottoms. This is important in order to retain a sharp edge on the knives.

Having thus described my invention, I claim:

1. In a device of the character described, a support, said support having on its top a longitudinal V shaped groove and made with a series of transverse equidistant notches, a cutter frame, a series of parallel equidistant knives diagonally fixed in said frame, said knives so stepped that the bottom edge of a higher knife clears the top edge of a lower knife, and means for guiding the cutter frame on the support so as to insure the proper registration of the knives with the transverse notches of the support.

2. In a device of the character described the combination of a grooved support with a cutter mechanism comprising, a cutter frame, a series of parallel equidistant diagonally disposed knives, said knives so stepped that the bottom edge of a higher knife clears the top edge of a lower succeeding knife and made at each end with a notch, a pair of bolts tying said frame together, said bolts registering with and extending through the notches of said knives, a pair of retaining bars locking said knives on said bolts, and means for guiding the cutter frame on the support.

3. In a device of the character described in combination, a grooved support, a cutter frame diagonally disposed relative to said support, a series of parallel equidistant knives diagonally fixed in said frame and so stepped that the bottom edge of a higher knife clears the top edge of a succeeding lower knife, means for guiding said cutter frame on said support, said means comprising, a sliding frame vertically adjustable on said support and positioned adjacent to the upper side member of said cutter frame, a pair of vertically disposed bars on said support, a guide plate detachably hung on said bars and said support and so positioned relative to the lower side member of the cutter frame as to guide and limit the vertical motion of said lower side member.

4. In a device of the character described in combination, a grooved support, a cutter mechanism, a series of parallel equidistant stepped knives diagonally fixed in said cutter mechanism, means detachably mounted on said support for guiding said cutter mechanism on said support, and means coöperating with the lower side member of said cutter mechanism for limiting the vertical motion of the cutter mechanism, said means preventing the cutting edges of said knives from coming in contact with said support.

In testimony whereof I affix my signature in presence of two witnesses.

THOMAS W. FORSTER.

Witnesses:
K. F. DOUGHTY,
C. C. ABBOTT.

---

Copies of this patent may be obtained for five cents each, by addressing the "Commissioner of Patents, Washington, D. C."